United States Patent Office 2,808,394
Patented Oct. 1, 1957

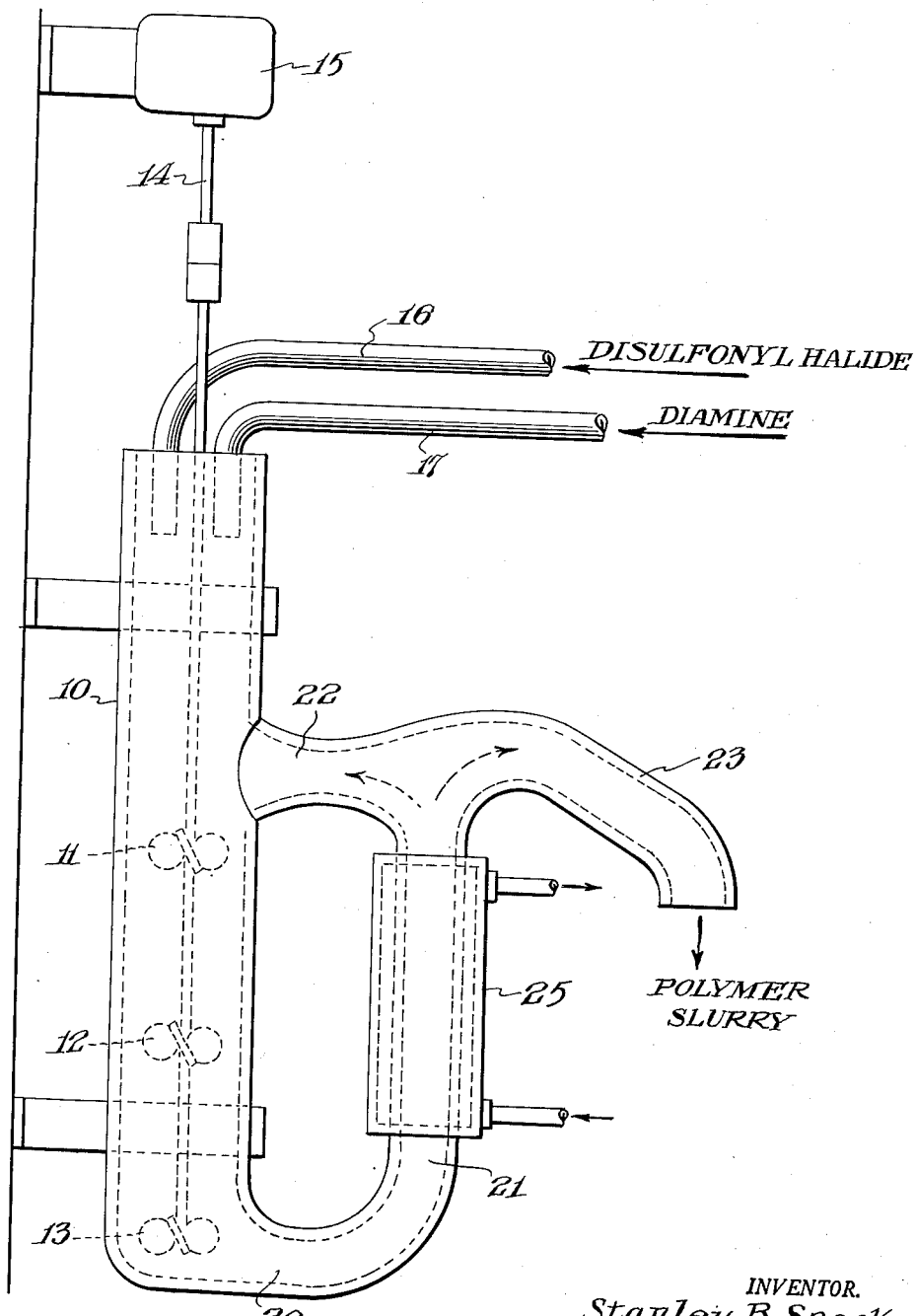

2,808,394
PROCESS FOR PREPARING POLYSULFONAMIDES

Stanley B. Speck, Marshallton, Del., assignor to E. I. du Pont de Nemours and Company, Wilmington, Del., a corporation of Delaware Application October 23, 1951, Serial No. 252,711

4 Claims. (Cl. 260—79.3)

This invention relates to the preparation of polysulfonamides from organic diamines and organic disulfonyl halides and relates more particularly to a process for preparing fiber-forming polysulfonamides by a moderate temperature interphase condensation polymerization.

It is well known that polyamides may be prepared by reacting at amide-forming temperatures, organic diamines with organic dicarboxylic acids, or amide-forming derivatives of these acids such as their esters. Representative patents covering this field include Carothers' U. S. Patents 2,071,250; 2,071,253; 2,130,523; 2,130,948 and 2,190,770. These patents all disclose that the successful preparation of high molecular weight fiber-forming polyamides is restricted to high temperature reaction in the range of 150° to 300° C. using pure reactants in substantially equivalent proportions. The polysulfonamides do not lend themselves to this type of preparation because of the relative instability of the intermediates at the high melt temperature required for polymerization.

Polysulfonamides have been prepared by the reaction of organic diamines with organic disulfonyl halides at lower temperatures, the condensation being carried out with either the pure reactants or in an inert liquid diluent which is a mutual solvent for the reactants, such as dioxane, as described in U. S. Patents 2,321,890 and 2,321,891 to Berchet. However, these polysulfonamides are of relatively low molecular weight and are, therefore, not useful for the preparation of orientable filaments where polyamides normally find their greater utility. Low molecular weight products result from this reaction even though acid acceptors such as alkalies, carbonates, or tertiary organic bases are present in the reaction medium. Only by subsequent heat treatment of the relatively stable aromatic polysulfonamides for example, at 200° to 225° C. for six hours or more, has it been possible to reach polysulfonamides having an intrinsic viscosity in the neighborhood of 0.3. These polysulfonamides of the prior art are not useful for the preparation of orientable films and fibers.

It is an object of this invention to provide poly-hexamethylene-arylenedisulfonamides which are suitable for the preparation of orientable fibers or films. Another object is to provide a process for producing fiber-forming polysulfonamides by a reaction of organic diamines with organic disulfonyl halides at moderate temperatures without the necessity of subsequent heat treatment. A further object is to provide such a process which is rapid, is readily practiced in continuous fashion, and produces a finely divided product. Other objects will become apparent from the following disclosure and the claims.

It has now been found that the reaction of organic diamines with organic disulfonyl halides proceeds smoothly and rapidly to the formation of fiber-forming polysulfonamides at moderate temperatures when these reactants are brought together in such a way that the reaction zone is at, or is immediately adjacent to, a liquid-liquid interface and most of the molecules of at least one of the intermediates must diffuse through liquid diluent to arrive at the reaction zone. The process for accomplishing this comprises bringing together the diamine in one liquid phase and the disulfonyl halide in a second liquid phase immiscible with the first phase, mixing the liquid phases to form a system comprised of two liquid phases such that the diamine and disulfonyl halide are in separate phases and at least one of the phases includes a liquid diluent, maintaining the phases in admixture until the desired condensation polymerization has taken place, and then if desired, separating the resulting polysulfonamide. Preferably an intermediate is a liquid under the reaction conditions or is dissolved in a diluent, but one of the intermediates may be a finely divided solid dispersed or suspended in a diluent in which the intermediate is at least partially soluble.

The drawing illustrates a suitable apparatus for carrying out the process in continuous fashion.

The above process may be carried out with a large number of variations, not all of which are equally adaptable to the preparation of each specific polysulfonamide. The broad methods falling within the purview of this new process and depicted in the examples hereinafter set forth, include the following: (1) non-aqueous systems in which at least one of the intermediates is dissolved or dispersed in a diluent or diluents such that at least two liquid phases are obtained upon the initial mixing, and (2) aqueous systems in which the diamine is dissolved or dispersed in water, or water and another diluent, and in which the disulfonyl halide is undiluted or is dissolved or dispersed in a non-aqueous liquid diluent of such character that on mixing the liquids a system of two liquid phases is obtained initially.

It will be seen that the first broad method encompasses such variations as (a) a diamine dissolved or dispersed in a non-aqueous liquid diluent and reacted with a liquid disulfonyl halide which is substantially insoluble in this non-aqueous diluent, (b) a disulfonyl halide dissolved or dispersed in a non-aqueous liquid diluent and reacted with a liquid diamine which is substantially insoluble in this non-aqueous liquid diluent, (c) a diamine dissolved or dispersed in a non-aqueous liquid diluent and reacted with a disulfonyl halide dissolved or dispersed in a non-aqueous liquid diluent such that the two non-aqueous diluents are immiscible, and (d) either a diamine or disulfonyl halide dissolved or dispersed in an emulsion of non-aqueous diluents and reacted with the other intermediate, which may be diluted with a non-aqueous diluent immiscible with one of the diluents for the first intermediate.

With respect to broad method Number (2), described above it is seen that the following variations are included therein, (a) a diamine dissolved or dispersed in water and reacted with a liquid disulfonyl halide, (b) a diamine dissolved or dispersed in water and reacted with a disulfonyl halide dissolved or dispersed in a non-aqueous liquid diluent which is immiscible with water, and (c) a diamine dissolved or dispersed in an emulsion of water and non-aqueous diluent and reacted with a disulfonyl halide, which may be diluted with a water-immiscible diluent.

For purposes of convenience, the polymerization process delineated in the paragraphs directly above shall hereinafter be called interphase polymerization. Furthermore, whenever a reactant is said to be "dispersed" in a diluent, in addition to the more usual meaning which encompasses the suspension of small discrete particles of solid or liquid in a diluent, this expression is intended to include cases in which the reactant is dissolved in a diluent, and "dispersion" is intended to include true solutions. While there is a technical difference between dispersions and true solutions, they are often difficult to distinguish and the two are equivalent in the practice of this invention.

The process for the preparation of polysulfonamides by interphase polymerization can be carried out over a considerable range of temperatures from just above the freezing point of the phase having the highest freezing point up to temperatures at which decomposition products form to an objectionable extent. However, in view of the rapidity with which fiber-forming polysulfonamides are formed at moderate temperatures, there is no advantage in using temperatures higher than 150° C. and it is preferred that the reaction be carried out in the moderate temperature range of −10° C. to +60° C.

It is essential that the solvent or diluent employed for a specific reactant not destroy the sulfonamide-forming ability of the reactant. It is not essential for the solvent or diluent used in one phase to be completely inert to the reactant in the other phase. Generally speaking, it is essential that the two reactants be more reactive toward each other than either reactant is to the solvent or diluent of the other phase. If this were not the case, the yield of polysulfonamide would be greatly reduced, or might even be non-existent.

Since the reaction rate of diamines with disulfonyl halides is rapid at room temperature, it is preferable that the addition of the two phases containing the separate reactants be accompanied by sufficiently rapid stirring to produce an emulsion of fine particle size. Such emulsions may be equally well produced by other means, for example, by impinging two high velocity liquid stream upon each other in a suitable manner. When an emulsion of fine particle size is provided the available diamine and/or the disulfonyl halide is completely used up in a matter of a few seconds or, at most in a matter of a few minutes, depending to an extent on the sum total of the reaction conditions.

Fibers are prepared from some of the polysulfonamides by spinning from a melt. The temperatures commonly employed for the production of melt-spun fibers are in the neighborhood of 200° to 300° C., and this may cause a further polyamidation reaction because the polymer chain still contains terminal sulfonamide-forming groups. When this occurs, the molecular weight and melt viscosity both increase. Such changes in viscosity and molecular weight may constitute a serious problem in the preparation of uniform filaments. This can be overcome by treating the unstabilized polyamide with a mono-functional reactant, such as a mono-amine or a mono acid halide, and thus block off the remaining amide forming end-groups to form a stabilized polymer. An alternative method is to employ a monofunctional amine or a monofunctional sulfonyl chloride as a stabilizer in the polyamide-forming reaction of this invention. Small amounts of these monofunctional reactants, for example, from 0.1 to 5 mole percent, will enter into the reaction during the formation of polysulfonamide chains and serve as non-reactive end-groups for these chains. Consequently, when such a ploymer is subsequently heated for the purposes of melt spinning, neither the molecular weight nor the viscosity will increase, since there are no amide-forming terminal groups in the polysulfonamide. Thus, a melt-stable polysulfonamide is obtained which has considerably more utility than the unstabilized material for this particular use.

Surprisingly, contrary to the teachings of the prior art, relatively impure reactants may be employed in the process for this invention. For example, disulfonic acids frequently constitute major impurities in disulfonyl halides. These disulfonic acids do not react under the conditions employed for the process of this invention and consequently do not enter into the polysulfonamide formation. Instead they remain in the spent reaction liquor and are easily separated from the solid precipitated polysulfonamide. Likewise, it has been found that the diamine may be grossly contaminated with a diamine carbonate, an impurity which is difficult to prevent. All manner of impurities which are non-reactive with either of the reactants under the conditions of this polymerization may be present without affecting the constitution or the purity of the resultant polysulfonamide. These impurities will not be a part of the polysulfonamides produced and will either remain in the spent reaction liquor or, should they be insoluble in the diluents employed, they can be readily leached from the polysulfonamide by simply percolating an appropriate solvent through a bed of the collected polysulfonamide. If any impurity is valuable as a starting material for the preparation of a reactant, it can be recovered from the spent liquor and then be converted to the reactant for use in the process. In this way the efficiency of the over-all reaction can be improved for impure reactants and the cost of the final product correspondingly reduced. Monofunctional reactants of the type described above which serve as stabilizers are of course not to be considered among the classes of impurities which can be tolerated in large amounts.

A surprising feature of this invention which is contrary to the teachings of the prior art is that the reactants do not need to be employed in equivalent proportions. The excess of one reactant simply remains in the supernatant liquid from which the polysulfonamides precipitate. It has been found that the process of interphase polymerization of diamines with disulfonyl halides yields polysulfonamides of high molecular weight whether one reactant is in excess by 300% or even more, or whether the reactants are in equivalent or nearly equivalent amounts. For purposes of economy, it is usually desirable to employ the reactants in equivalent or nearly equivalent amounts.

The concentration of the reactants in the separate liquid phases can vary over wide limits and still produce high molecular weight polysulfonamides. Either reactant, but not both, may be employed in 100% concentration as the pure compound. Likewise, either reactant may be employed in a very low concentration in its separate liquid phase, for example, concentrations as low as 0.1% or even lower are useful.

It is advantageous to employ an emulsifying agent to assist in suspending one liquid phase in the other. To this end, water or organic soluble emulsifying agents may be used. Examples of organic soluble agents are the "Spans" (Atlas Co., sorbitan mono fatty acid esters), the higher fatty alcohols, the higher fatty alcohol esters, "Naccolene F" (Allied Chem. & Dye Co., alkyl aryl sulfonate) "Acto 700" (Stanco Inc., sodium pertoleum sulfonate), "Alkaterge C" (Commercial Solvents Corp. substituted oxazoline), "Betanols" (Beacon Co. high molecular weight esters) "Duponol OS" (Du Pont Co., higher alcohol derivative).

Where one phase is aqueous, the emulsifying agents may be cationic, anionic or non-anionic. Representative examples of cationic emulsifying agents are "Lorol" pyridinium chloride ("Lorol" is the trade name for the mixture of aliphatic alcohols obtained by hydrogenation of coconut oil), "Triton K–60" (Rohm & Haas Co., cetyl dimethyl benzyl ammonium chloride) "Nopcogen 17L" (Nopco Chem. Co., a hydroxylated polyamide). Representative examples of non-ionic agents are the "Tweens," (Atlas Co., polyoxyethylene derivatives of sorbitan mono-esters of long-chain fatty acids) "Triton N–100" (Rohm & Haas Co., alkylated aryl polyether alcohol), the "Elvanols" (Du Pont Co., partially hydrolyzed polyvinyl acetates of various molecular weights), etc. and representative examples of the anionic emulsifying agents are soaps, the amine salts, "Duponol ME" (Du Pont Co., sodium "Lorol" sulfate), "Aerosol OT" (American Cyanamid Co., dioctyl ester of sodium sulfosuccinic acid), "Aresklene 400" (Monsanto Chemical Co., dibutyl phenol sodium disulfonate) "MP–189S" (Du Pont Co., hydrocarbon sulfonate), etc.

It is likewise desirable to use an acid acceptor for the hydrogen halide which is liberated in the course of the reaction of the organic primary or secondary diamine with the organic sulfonyl halide. The diamine itself can serve as the acid acceptor by forming the amine salt. Since the amine salt is incapable of reacting with the disulfonyl halide, it is desirable in this instance to start with at least 2 equivalents of diamine for every equivalent of disulfonylhalide to ensure that all the disulfonyl halide is used up. To circumvent the necessity for using this large excess of diamine, it is necessary to add an acid acceptor, preferably continuously to the reaction mixture in the amount which is equivalent to the amount of liberated hydrogen halide. Larger amounts or lesser amounts of the added acid acceptor may be employed. The added acid acceptor may range from zero up to an amount equivalent to 5 times the diamine present or even more. Preferably, the added acceptor, if one is used, will be in the range of 1 to 3 times the amount equivalent to the diamine present. Preferably, the added acid acceptor should be a stronger base than the diamine contained in the same liquid phase so that the hydrogen halide preferentially reacts with the added acid acceptor. Depending on the basicity of the diamine the added acid acceptor may be caustic alkali, an alkali carbonate or other salt of a strong base and a weak acid or a tertiary organic base.

These basic materials may be added directly to one of the liquid phases or sometimes to both the liquid phases either before or during, preferably during, the course of the reaction. Or, if these basic materials are not added at this stage, they may be added to the spend reaction liquor as a means of reforming the diamine from the diamine hydrohalide, so that the diamine may be put through the reaction again. As can be seen in the examples hereinafter set forth, the liquid phase containing the diamine cannot be strongly alkaline because such a system prevents the preferential reaction of the disulfonyl halide with the diamine.

It is sometimes desirable to load the solvent for the respective reactants with non-reactive solutes so as to produce, for example, a better yield, or a higher molecular weight, or a more useful polysulfonamide. Such non-reactive substances may be salts such as sodium chloride, potassium bromide, lithium sulphate and the like for loading the aqueous phase.

Copolysulfonamides are prepared by substantially the same procedure as homopolysulfonamides by the process of this invention. Where the reactants are one diamine and one disulfonyl halide, a homopolysulfonamide results. Where the reactants are two or more diamines and one disulfonyl halide or two or more disulfonyl halides and one diamine or two or more disulfonyl halides and two or more diamines, copolysulfonamides are produced having compositions which depend on the ratios and reactivities of the intermediates.

The following examples illustrate preferred methods of practicing the invention and the effect of variations of operating conditions on the products obtained and the yields, but are not to be construed as limiting the scope of the invention. In these examples the inherent viscosity values of the products are given as an indication of the degree of polymerization obtained. In view of the relative ease with which these values are determined, they provide a useful method of evaluating the effect of process variables on a given type of polymerization. The values may be misleading when used to compare different types of polysulfonamides but, in general, a value of at least about 0.4 is necessary for a polysulfonamide to be spinnable, and values in the approximate range of 0.7 to 1.5 are preferred in the preparation of orientable fibers, filaments or films. In determining these values, viscosimeter flow times were obtained at 25.0°±0.1° C. for concentrated sulfuric acid and for a solution of the polysulfonamide in the sulfuric acid at a concentration of 0.5 gram per 100 cubic centimeters of solution. The inherent viscosity value was then calculated as 2 times the natural logarithm of the relative viscosity of the solution compared to that of the sulfuric acid.

EXAMPLE 1

In a Waring Blendor with high speed stirring, an emulsion comprising 70 parts of xylene, 80 parts of water, 2 parts of NaOH, 0.8 part of "Duponol" ME and 2.9 parts (0.0260 mole) of hexamethylenediamine was prepared. To this emulsion, which was at a temperature of about 30° C., was added a solution of 7 parts (0.0250 m.) of metabenzenedisulfonyl chloride in 13.2 parts of benzene. The mixture was stirred for ten to fifteen minutes after complete addition, which required one to two minutes. The temperature rose about 10° C. The mixture was then made acid with hydrochloric acid and warmed on the steam bath until the emulsion broke. The polymer was collected on a filter and washed first with alcohol, then acetone, and finally with hot water. After drying at 100° C. in a vacuum oven, a yield of 5.5 parts of a spinnable polysulfonamide (70% yield), having an inherent viscosity of 0.41 in concentrated sulfuric acid, was obtained.

EXAMPLE 2

This example will illustrate the influence of various acid acceptors on the yield and inherent viscosity of the polysulfonamide product. The experimental conditions were identical with those of Example 1 with the exception of the mount and identity of the acid acceptor in the original emulsion before adding the disulfonyl halide. The results are tabulated for convenience.

*Table I*

| Acid Acceptor | Percent Yield | Inherent Viscosity |
| --- | --- | --- |
| 2 parts NaOH | 70 | 0.41 |
| 4 parts NaOH | 70 | 0.14 |
| 19 parts Na$_3$PO$_4$12H$_2$O | .79 | .0.62 |
| 10 parts Na$_3$PO$_4$12H$_2$O | 67 | 0.59 |
| 13.5 parts Na$_2$HPO$_4$7H$_2$O | 49 | 0.48 |
| 40 parts Na$_2$HPO$_4$7H$_2$O | 57 | 0.49 |
| 10 parts Na$_2$B$_4$O$_7$10H$_2$O | 67 | 0.78 |
| 20 parts Na$_2$B$_4$O$_7$10H$_2$O | 72 | 0.72 |
| 20 parts CaCO$_3$ | 35 | 0.56 |
| 3 parts CaO | 68 | 0.49 |
| 10.1 parts Triethylamine | 71 | 0.52 |
| 2.7 parts Na$_2$CO$_3$ | 69 | 0.48 |
| 4.2 parts NaHCO$_3$ | 54 | 0.54 |

EXAMPLE 3

This example illustrates the improvement obtained by adding the acid acceptor and the disulfonyl halide simultaneously to the emulsion containing the diamine in the Waring Blendor. An amulsion comprising 80 parts of water, 0.8 part of "Duponol" ME, 2.8 parts (0.0250 mole) of hexamethylenediamine and 43.5 parts of xylene was prepared in the Waring Blendor. A solution of 7 parts (0.0250 mole) of metabenzenedisulfonyl chloride in 43.5 parts of xylene and a solution of 2 parts of sodium hydroxide in 50 parts of water were added simultaneously and at about the same rate from two separate burettes with rapid stirring. The complete addition required one to two minutes and the mixture was stirred for an additional ten to fifteen minutes. The mixture was then acidified with hydrochloric acid and warmed on a steam bath until the emulsion broke. After filtering, washing, and drying as described in Example 1, a yield of 6.8 parts (85.5%) of a spinnable polysulfonamide having an inherent viscosity of 0.98 in concentrated sulfuric acid was obtained.

Polysulfonamide of somewhat higher molecular weight was obtained when the diamine is used in excess of the theoretical amount. Thus, when Example 3 was repeated using 2.9 parts (4% excess) instead of 2.8 parts of hexamethylenediamine, an 87% yield of polysulfonamide having an inherent viscosity of 1.08 was obtained. However, when the benzenedisulfonyl chloride was used in 5% excess the inherent viscosity dropped to 0.80.

EXAMPLE 4

Increasing the amount of organic solvents in the initial emulsion system can lead to lower molecular weight polysulfonamide products as shown in the following example. An emulsion comprising 80 parts of water, 0.8 part of "Duponol" ME, 2.9 parts of hexamethylenediamine and 61 parts of xylene was prepared in the Waring Blendor. A solution of 7 parts of metabenzenedisulfonyl chloride in 43.5 parts of xylene and a solution of 2 parts of sodium hydroxide in 50 parts of water were added simultaneously and at about the same rate from two separate burettes while stirring the emulsion rapidly. The complete addition required one to two minutes and the mixture was stirred for an additional ten to fifteen minutes. The polysulfonamide product was recovered in the manner described in Example 1. A yield of 87% of a spinnable polysulfonamide, having an inherent viscosity of 0.57, was obtained.

EXAMPLE 5

Much higher molecular weight polysulfonamides are obtained by the process of this invention when the organic solvent is omitted from the initial diamine system. In this case, one starts with a solution of diamine and dispersing agent in water, instead of an emulsion of diamine and dispersing agent in water and water-immiscible organic solvent.

To a solution of 2.9 parts of hexamethylenediamine and 0.8 part of "Duponol" ME in 80 parts of water in a Waring Blendor, there was added with rapid agitation a solution of 7 parts of metabenzene-disulfonyl chloride in 43.5 parts of xylene and a solution of 2 parts of sodium hydroxide in 50 parts of water, simultaneously from two separate burettes. Whether the addition was rapid (complete in about one minute) or somewhat slow (over a period of three to four minutes), the polysulfonamide product obtained after recovery as in Example 1 had an inherent viscosity of 1.46. The yield of polysulfonamide product was slightly higher for the rapid addition, being 90% vs. 82% for the slower addition.

This polysulfonamide, in common with those described in the previous examples, is soluble in dimethyl formamide and also very soluble in 10% aqueous sodium hydroxide. It can be regenerated from the latter by acidification and recovered unchanged. The polymer was melt spun at 200° C. into a monofilament which, after drawing to three times its original length at 70° C., had the following properties: dry tenacity, 1/2 g. p. d.; elongation at break, 51%; initial tensile modulus, 33 g. p. d.; and tensile recovery from 5% elongation, 64%. In these respects the polysulfonamide filament had the resilience properties of fine wool. The drawn filament was readily heat-set by boiling water, X-ray indicated that the heat-set filament was crystalline and highly oriented.

EXAMPLE 6

This example, in comparison with the previous example, illustrates the importance of the dispersing agent. A solution of 2.8 parts of hexamethylenediamine in 80 parts of water was placed in a Waring Blendor. A solution of 7 parts of metabenzene-disulfonyl chloride in 43.5 parts of xylene and a solution of 2 parts of sodium hydroxide in 50 parts of water were added simultaneously to the diamine solution in the Waring Blendor with rapid agitation. The addition was complete in one to two minutes and the mixture was stirred for an additional ten to fifteen minutes. After recovery of the polysulfonamide as in Example 1, there was obtain a yield of 4.8 parts (60%) of a spinnable polysulfonamide having an inherent viscosity of 0.74 in concentrated sulfuric acid. Thus, the average molecular weight of the polysulfonamide of this example is apparently after half that obtained in the previous example wherein a dispersing agent was used.

EXAMPLE 7

Even more important is the concentration of diamine in the solvent employed for the diamine in determining the molecular weight of the polysulfonamide product. For preparing high molecular weight polysulfonamides by the process of this invention one should employ low solution concentrations of diamines. The adverse effect on molecular weight by more than doubling the concentration of diamine in its solvent is illustrated in the following example. A solution of 2.9 parts of hexamethylene diamine and 0.8 part of "Duponol" ME in 35 parts of water was placed in the Waring Blendor. To this solution with violent agitation, there was added simultaneously from separate burettes, a solution of 7 parts of metabenzenedisulfonyl chloride in 43.5 parts of xylene and a solution of 2 parts of sodium hydroxide in 50 parts of water. While an 88% yield of polysulfonamide was obtained, the inherent viscosity of the product was quite low, being only 0.33.

EXAMPLE 8

A solution of 2.9 parts of hexamethylenediamine and 0.8 part of "Duponol" ME in 80 parts of water was placed in a Waring Blendor. This diamine solution was stirred rapidly while adding a solution of 9.12 parts of methylene bis-para-benzene-sulfonyl chloride in 35 parts of xylene and a solution of 2 parts of sodium hydroxide in 50 parts of water simultaneously from two separate burettes. The complete addition required one to two minutes and the mixture was stirred for an additional ten to fifteen minutes. The polysulfonamide product was recovered as in Example 1 in 97% yield and had an inherent viscosity of 0.46 in concentrated sulfuric acid. The polymer was spinnable, had a stick temperature of 140–150° C. and was pressed into a clear film at 190° C. The polymer showed little tendency to crystallize and was highly plasticized, but not dissolved, by acetone.

It was found that the identity of the organic diluent immiscible with the diamine solvent affected the molecular weight of the polysulfonamide product. For example, when the xylene in this experiment was replaced with a similar quantity of methyl-n-amyl ketone, the polysulfonamide obtained had an inherent viscosity of 0.63. On the other hand, repetition of the experiment, using tetrachloroethylene in place of xylene, yielded a polysulfonamide having an inherent viscosity of 0.36.

EXAMPLE 9

Methyl-n-amyl ketone has been found to be a preferred organic solvent for the disulfonyl chloride in the process of this invention when aqueous diamine solution is used. High molecular weight polysulfonamides from ethylenediamine are among the most difficult to prepare. However, with a methyl-n-amyl ketone/water system satisfactory results are obtained. A solution of 1.6 parts of ethylenediamine and 0.8 part of "Duponol" ME in 80 parts of water was placed in a Waring Blendor. A solution of 7 parts of metabenzenedisulfonyl chloride in 41 parts of methyl-n-amyl ketone and a solution of 2 parts of sodium hydroxide in 50 parts of water were added simultaneously from separate burettes to the rapidly stirred diamine solution. After recovering the polysulfonamide product as in Example 1, a 53.5% yield of a spinnable polymer having an inherent viscosity of 0.56 in concentrated sulfuric acid was obtained. This polymer, having a stick temperature of 170°–180° C., was melt pressed into a clear, somewhat brittle film.

EXAMPLE 10

A solution of 2.9 parts of hexamethylenediamine and 0.8 part of "Duponol" ME in 80 parts of water was prepared in a Waring Blendor. A solution of 10.4 parts of p,p'-diphenylsulfone-disulfonyl chloride in 66 parts of chlorobenzene and a solution of 2 parts of sodium hydroxide in 50 parts of water were added to the aqueous diamine solution simultaneously with rapid agitation. A spinnable polysulfonamide product was recovered as in Example 1 in 80% yield and had an inherent viscosity of 0.57 in concentrated sulfuric acid. The polysulfonamide softened at 210°–220° C. and was pressed into a clear film which crystallized rapidly upon treatment with acetone.

EXAMPLE 11

A Waring Blendor was charged with 116 parts of distilled water, 1.25 parts of "Duponol" ME and 2.8 parts of hexamethylenediamine dissolved in 6.5 parts of water. A solution of 7.08 parts (0.025) of hexamethylenedisulfonyl chloride in 150 parts of chloroform was added with stirring during two minutes. Immediately thereafter, 8.2 parts (0.05 mol) of an aqueous sodium hydroxide solution was added during 23 minutes, the rate of addition being such that the pH of the mixture was maintained at 9.5–10.0. The reaction mixture was stirred another five minutes and then acidified with hydrochloric acid. The reaction product was filtered, washed thoroughly with water and then with ethanol and dried. A yield of 6.8 parts (83%) of polysulfonamide having an inherent viscosity of 0.43 in concentrated sulfuric acid was obtained. Fibers could be drawn from the molten polymer.

The apparatus shown in the drawing may be used conveniently for the continuous preparation of polysulfonamides by the process of this invention. This apparatus comprises a glass reaction vessel 10 provided with an agitator comprising three-bladed propellors 11, 12 and 13 mounted on shaft 14 driven by motor 15. These propellors are located near the top, middle and bottom, respectively, of the vessel. The reactants are added in separate solutions at the top of the vessel directly above propellor 11 through pipes 16 and 17. A slurry of polymer and liquid is withdrawn from the bottom of the vessel through pipe 20, and passed upward through pipe 21, part of the slurry being recirculated to the top of vessel 10 through pipe 22. The remainder of the slurry is withdrawn through overflow pipe 23 and filtered to recover the polymer. The slurry may be cooled or heated during passage through pipe 21 by circulating fluid through jacket 25.

In general, the properties of the polysulfonamides were found to be quite similar. The melting characteristics were about the same and were quite unusual in that they all have extremely high melt viscosities. Thus, the polymer from hexamethylenediamine and metabenzenedisulfonic acid chloride softens and can be melt-pressed into clear film at 170° C., but is a non-flowing gelatinous mass even at 210° C. Surprisingly enough the crystalline polymer softens only a few degrees higher than the amorphous polymer.

The polysulfonamides possess solubility characteristics considerably different from corresponding polyamides; for example, polysulfonamides generally were insoluble in such solvents as phenol and metacresol, but were quite soluble in dimethylformamide, concentrated sulfuric acid and 10% aqueous sodium hydroxide. The polymer could be regenerated from solution in 10% sodium hydroxide by acidification of the solution and recovered essentially unchanged. A polysulfonamide from hexamethylenediamine and metabenzenedisulfonyl chloride, having an inherent viscosity of 0.94, was dissolved in 10% sodium hydroxide and the solution kept for six days before precipitating the polymer by acidification. The regenerated polymer had an inherent viscosity of 0.80 which indicates only slight degradation. The solutions of polysulfonamides in 10% sodium hydroxide show a very unexpectedly low viscosity; for example, a 20% solution of the polymer from hexamethylenediamine and metabenzenedisulfonyl chloride (inherent viscosity 0.94) in aqueous 10% sodium hydroxide was no more viscous than glycerine.

Acetone exerts a strong solvent action on amorphous polysulfonylamides. Those polymers which crystallize fairly readily can be rapidly crystallized by treatment with acetone. The amorphous polymer first becomes sticky and tends to dissolve, then the polymer becomes opaque and rapidly crystallizes. Polymers which do not tend to crystallize become very highly plasticized when treated with acetone as indicated in Example 8. The dibutyl ether of tetraethylene glycol was found also to exert strong plasticising action on the polysulfonamides.

Any organic disulfonyl halide may be used in the process of this invention. This includes the acid fluorides, chlorides, and bromides of aliphatic, aromatic, and cycloaliphatic disulfonic acids. Illustrative of disulfonyl halides which may replace those mentioned in the examples are decane-1,10-disulfonyl chloride; hexane-1,6-disulfonyl chloride; 3,6-dioxaoctane-1,8-disulfonyl chloride; paracyclohexanedisulfonyl chloride; nuclear substituted benzenedisulfonyl chlorides; naphthalenedisulfonyl chlorides, and the like. Disulfonyl iodides are generally quite unstable and impractical to use.

The classes of diamines which may be used in the process of this invention include the basic materials represented by the aliphatic primary and secondary diamines, aromatic primary diamines, aralkyl primary diamines, and cycloaliphatic diamines. In addition to the diamines used in the examples, representative diamines of the above classes of reactants which can be used in accordance with this invention include tetramethylenediamine, pentamethylenediamine, 2,5-dimethylhexamethylenediamine, decamethylenediamine, piperazine, bis-(N-aminoethyl)piperazine, N,N'-dimethylhexamethylenediamine, N-methylhexamethylenediamine, o, m and p-phenylenediamine, 3,6-diaminodurene, benzidine, naphthalene diamines, p-aminobenzylamine, 1,4-diaminocyclohexane and hexahydroparaxylylenediamine. Amino groups of very low basicity, such as N-aryl substituted aromatic amino groups do not respond in the process of this invention.

The advantages of the interphase polymerization process for polysulfonamides over the methods previously described in the prior art are many and varied. By the method of this invention, polysulfonamides which decompose at temperatures below their melting point may be easily and simply prepared with essentially no degradation products. Likewise, those polysulfonamides which are normally prepared from reactants that decompose at the temperature employed may be produced simply and easily by the process of this invention. It is further seen that complicated or high strength equipment is not necessary for the process of this invention since the reaction is carried out preferably in the range including room temperature under atmospheric pressure. An additional advantage for this invention is that it is not necessary to maintain an exact equivalent of the reactants in the reacting mixture. Importantly, the process of this invention for the production of polysulfonamides yields the final product in an extremely short period of time after the reaction is initiated. As a result an enormous productivity can be achieved from relatively simple equipment occupying only a relatively small amount of floor space. Still another advantage is that the polysulfonamides of this invention are obtained in a finely divided or granular state, which is easily dissolved for the purposes of wet spinning or dry spinning, and which is readily melted for the melt-spinning process disclosed for polyamides of the prior art.

Another and important advantage of this invention is that it can be practiced in a continuous fashion. The streams of the two reactant liquids can be brought together in equipment such as is shown in the drawing, or the same end can be accomplished in many other ways. For example, the streams of the two liquid reactants may be made to impinge upon each other at a high velocity so as to form an emulsion of fine droplet size. This emulsion need exist only for the very short time in which the reaction takes place. The resulting polysulfonamide may then be separated from the spent reaction liquors. The advantages attributable to continuous processes are well appreciated in the chemical field.

Another important advantage of the invention is that polysulfonamide dispersions can be prepared directly from the reactants by using the emulsion polymerization procedure disclosed, but not breaking the emulsion after the reaction has been completed. The dispersions can be used as prepared in a stable dispersed state for coating applications, or the dispersions can be broken when desired.

The polysulfonamides produced by the process of this invention have utility in many and varied fields. They may serve as ingredients of coating compositions, or they may be molded into useful plastic articles. Because the molecular weights attainable are much higher than those of the prior art, they may be used for the production of fibers, filaments and films. Thus, they possess more utility than the polysulfonamides prepared by the methods of the prior art.

As many different embodiments of the present invention may be made without departing from the spirit and scope thereof, it is to be understood that the invention is not limited to the specific embodiments disclosed except to the extent defined in the appended claims.

What is claimed is:

1. A process for preparing a fiber-forming polysulfoamide which comprises adding simultaneously, to a well agitated aqueous dispersion of a diprimary aliphatic diamine containing at least 2 carbon atoms, the said dispersion containing at least about 80 parts of water to each 0.026 mol parts of diamine, (a) a solution of an organic disulfonyl halide in a water-immiscible solvent and (b) an aqueous solution of acid acceptor to neutralize hydrogen halide as formed, the reaction mass being maintained between about $-10°$ C. and $+60°$ C.

2. The process of claim 1 wherein the diamine is hexamethylenediamine.

3. The process of claim 1 wherein the dissulfonyl halide is an arylenedisulfonyl halide.

4. The process of claim 1 wherein the process is rendered continuous by removal of polymer as formed and repletion of diamine suspension as exhausted.

References Cited in the file of this patent

UNITED STATES PATENTS

| | | |
|---|---|---|
| 2,321,891 | Berchet | June 15, 1943 |
| 2,667,468 | Jones et al. | Jan. 26, 1954 |

FOREIGN PATENTS

| | | |
|---|---|---|
| 524,795 | Great Britain | Aug. 14, 1940 |
| 895,395 | France | Jan. 23, 1945 |

OTHER REFERENCES

Schmidt et al.: "Principles of High Polymer Theory and Practice" (1948), McGraw-Hill, pages 65–67.